UNITED STATES PATENT OFFICE.

CARL PAAL, OF LEIPZIG, AND CONRAD AMBERGER, OF ERLANGEN, GERMANY, ASSIGNORS TO THE FIRM OF KALLE & COMPANY, AKTIENGESELLSCHAFT, OF BIEBRICH, GERMANY.

PREPARATION CONTAINING COLLOIDAL COMPOUNDS.

1,077,891.  Specification of Letters Patent.  Patented Nov. 4, 1913.

No Drawing. Original application filed May 12, 1913, Serial No. 767,205. Divided and this application filed September 27, 1913. Serial No. 792,177.

*To all whom it may concern:*

Be it known that we, CARL PAAL, resident of Leipzig, and CONRAD AMBERGER, resident of Erlangen, Germany, both citizens of the German Empire, have invented certain new and useful Improvements in Preparations Containing Colloidal Compounds, of which the following is a specification.

In our patent specification Ser. No. 767,205, of May 12th, 1913, of which the present case is a division, we have described the production of preparations of a greasy consistency containing inorganic metal colloids of the platinum group. This process consists in incorporating solutions of the divalent salts of the metals of the platinum group with bodies maintaining colloids in the colloidal state (protecting colloids) especially with wool fat or the alcohols obtainable therefrom by saponification, and adding a carbonate of an alkali to form the colloidal lower hydroxids of the metals employed. Now we have found that also preparations containing combinations of the divalent salts of the metals of the platinum group in a colloidal condition can be obtained, if instead of the alkali carbonates used in the above mentioned process, the alkali salts of certain weak organic acids are selected, for instance the salts of the higher, saturated, or unsaturated, fatty acids (soaps). In this way there are produced in the presence of solutions of the said metal salts for instance of the divalent palladium, or platinum, triturated with wool fat, products which contain the corresponding palladium, or platinum, salts dissolved in colloidal form in the wool fat. This could not have been foreseen, because it was to be assumed that these platinum, or palladium, salts would split off by hydrolysis with weak organic acids in the presence of the water required for the solution of the components.

The platinum and palladium salts of fatty acids are more or less strongly dissociated by hydrolysis in the presence of water or aqueous solution; more especially is this true of the fatty acids of high molecular weight such, for instance, as palmitic, stearic, or oleic acids. On this dissociation depends, as is well known, the action of the ordinary washing soaps, which are salts of the strong bases, potash, and soda.

If, as initial materials, definite quantities of wool fat and inorganic palladious or platinous salts be used, products having a quite definite content of palladium, or platinum, organosols can be obtained.

The content of colloidal palladium and platinum compounds in the preparations can be enriched by partially precipitating solutions of the products having a definite content of palladium, or platinum, colloid, for instance the solutions in pretroleum ether, obtainable during the process by an organic liquid in which wool fat, or wool fat alcohols, are difficultly soluble. The surprising result is then obtained that the corresponding colloidal platinum compounds pass quantitatively into the precipitate with a part of the wool fat, whereby they fully retain their colloidal character, so that the precipitations which present a corresponding higher amount of the corresponding platinum metal colloid, likewise possess the valuable property of being absorbed in the form of the liquid organosols, by all organic liquids dissolving wool fat or wool fat alcohols.

The following example will further illustrate how this invention can be carried into practice, but the invention is not limited to the said example.

*Example—Production of a preparation containing 25 per cent. colloidal palladious oleate.*—If wool fat be impregnated with a concentrated aqueous solution of palladious chlorid ($PdCl_2$) and the mass be then triturated with the equivalent quantity of potassium oleate in concentrated aqueous solution, the salts mutually decompose with formation of potassium chlorid and palladious oleate which as already stated remains dissolved in colloidal form in the wool fat. As the palladious chlorid is difficultly soluble in pure water, but readily in hydrochloric acid it is dissolved in the latter and the acid is neutralized before triturating the liquid with wool fat by means of an amount of sodium carbonate equivalent to the hydrochloric acid used. The neutral $PdCl_2$ then remains dissolved in the liquid.

In order to obtain a preparation containing about 25 per cent. colloidal palladious oleate 0.85 parts of palladious chlorid $PdCl_2 = 0.5$ parts of palladium are dissolved with the application of heat in 0.45 parts of fuming hydrochloric acid (38 per cent. HCl) and 2 parts of water, and the hydrochloric acid is neutralized by the addition of 0.3 parts of anhydrous soda either solid or dissolved in 0.7 parts of water. The solution of $PdCl_2$ thus obtained is then triturated intimately in small portions with 9.5 parts of wool fat softened at a gentle heat. Into the ointment body thus obtained are then stirred, also in small portions, 3.5 parts of potassium oleate dissolved in 15 parts of water. The formation of the palladium oleate is detected by the fact that the greasy mass colored red-brown by the palladious chlorid becomes, on being triturated with the potassium oleate, first yellow-brown, then gray-brown and, after being allowed to stand some considerable time, black-brown. For the purpose to purify the product it may be either treated repeatedly with hot water at from 50° to 60° centigrade, and the ointment mass dried *in vacuo* at from 40° to 50° centigrade, for the purpose of removing the water; or the original product may be dissolved in from 5 to 6 times its volume of petroleum ether of low boiling point, the greater part of the by-products remaining undissolved and the red-brown liquid organosol being dried with calcium chlorid or dehydrated sodium sulfate. In this case a further part of the by-products separates along with the water. The petroleum ether is then distilled off from the liquid freed from the drying agent.

The colloidal palladium oleate can be enriched in the ointment body in the manner hereinbefore described, by dissolution in petroleum ether and precipitation with alcohol. A product is thus obtained containing about 70 per cent. of colloidal palladium oleate, which like the 25 per cent. preparation, is absorbed as organosol by all organic substances dissolving wool fat.

In lieu of oleic acid, other higher fatty acids which form alkali salts soluble in water can be used. Likewise, instead of a palladious salt a platinous or other salt of the platinum group can be used for instance the salt of divalent platinum resulting from the reduction of the platino-chlorid-hydrochloric acid with sulfur dioxid. If under the conditions of investigation already stated, wool fat impregnated with a platinous salt be acted on by an aqueous solution of potassium oleate, a colloidal platinous-oleate $(C_{18}H_{33}O_2)_2Pt$ is formed.

Inasmuch as the wool fat acts in the present process as a body preserving the colloidal state of the salts of the metals of the platino group other mediums may be employed instead of the wool fat fulfilling the same effect. So for instance the mixture of the wool fat alcohols obtained from wool fat by saponification can be used in the same manner. The wool fat alcohols are in their properties very similar to the wool fat itself and the mixture of alcohols obtained therefrom by saponification presents a still greater affinity for water than wool fat. The wool fat alcohols have a more solid consistency than the wool fat. According as it is desired to obtain preparations of harder or softer quality, the initial material used for the purpose is either a mixture of wool fat alcohols *per se* or their mixture with wool fat, which last mixture is obtained by melting the components together. The production of the ointment preparations is effected in the described manner. The wool fat alcohols are accordingly considered the equivalent of the wool fat in the process and product of the present invention.

We claim:

1. Process for the production of preparations containing inorganic colloids, consisting in incorporating a solution of a divalent salt of a metal of the platinum group with a protecting colloid, adding a soap solution to form the colloidal soap of the metal and removing the by-products formed in the process from the resulting preparation.

2. Process for the production of preparations containing inorganic colloids, consisting in incorporating a solution of a divalent salt of a metal of the platinum group with a protecting colloid, adding a soap solution to form the colloidal soap, dissolving the soft mass, mixing the solution with a liquid sparingly dissolving or not dissolving the protecting colloid and separating the precipitate containing the colloid.

3. Process for the production of preparations containing inorganic colloids, which consists in incorporating with a solution of a divalent salt of a metal of the platinum group wool fat as a protecting colloid, adding an alkali salt of a higher fatty acid to form a colloidal soap of the metal, and removing the by-products formed in the process from the resulting preparation.

4. Process for the production of preparations containing inorganic colloids, which consists in incorporating with a solution of a divalent salt of a metal of the platinum group, a protecting colloid, converting such metal into the form of an oleate by treating with a soluble alkali oleate, and removing the by-products formed in the process from the resulting product.

5. As new products preparations containing a colloidal soap of a metal of the platinum group together with a protecting colloid.

6. As new products, preparations containing a colloidal soap of a divalent metal of the platinum group, together with wool fat constituents as a protective colloid.

7. As new products, preparations containing a colloidal soap of a divalent metal of the platinum group, together with wool fat as a protective colloid.

8. As new products, preparations containing colloidal palladious soap, together with a protective colloid.

9. As new products, preparations containing colloidal palladious soap, together with wool fat constituents as a protective colloid.

10. As new products, preparations containing colloidal palladious soap, together with wool fat as a protective colloid.

11. As new products, preparations containing a colloidal oleate of a divalent metal of the platinum group, together with wool fat constituents as a protective colloid.

12. As new products, preparations containing a colloidal oleate of a divalent metal of the platinum group, together with wool fat as a protective colloid.

13. As new products, preparations containing colloidal palladious oleate, together with a protective colloid.

14. As new products, preparations containing colloidal palladious oleate, together with wool fat constituents, as a protective colloid.

15. As new products, preparations containing colloidal palladious oleate, together with wool fat as a protective colloid.

In testimony whereof we have signed our names to this specification in the presence of two subscribing witnesses.

CARL PAAL.
CONRAD AMBERGER.

Witnesses as to signature of Carl Paal:
   Max Beesen,
   Hermann Apitzud.

Witnesses as to signature of Conrad Amberger:
   Oscar Bock,
   George Nicolas Ifft.